April 4, 1961
H. A. HAMBERGER ET AL
2,977,822
AUTOMATIC SAW SHARPENER
Filed Aug. 18, 1958
3 Sheets-Sheet 2
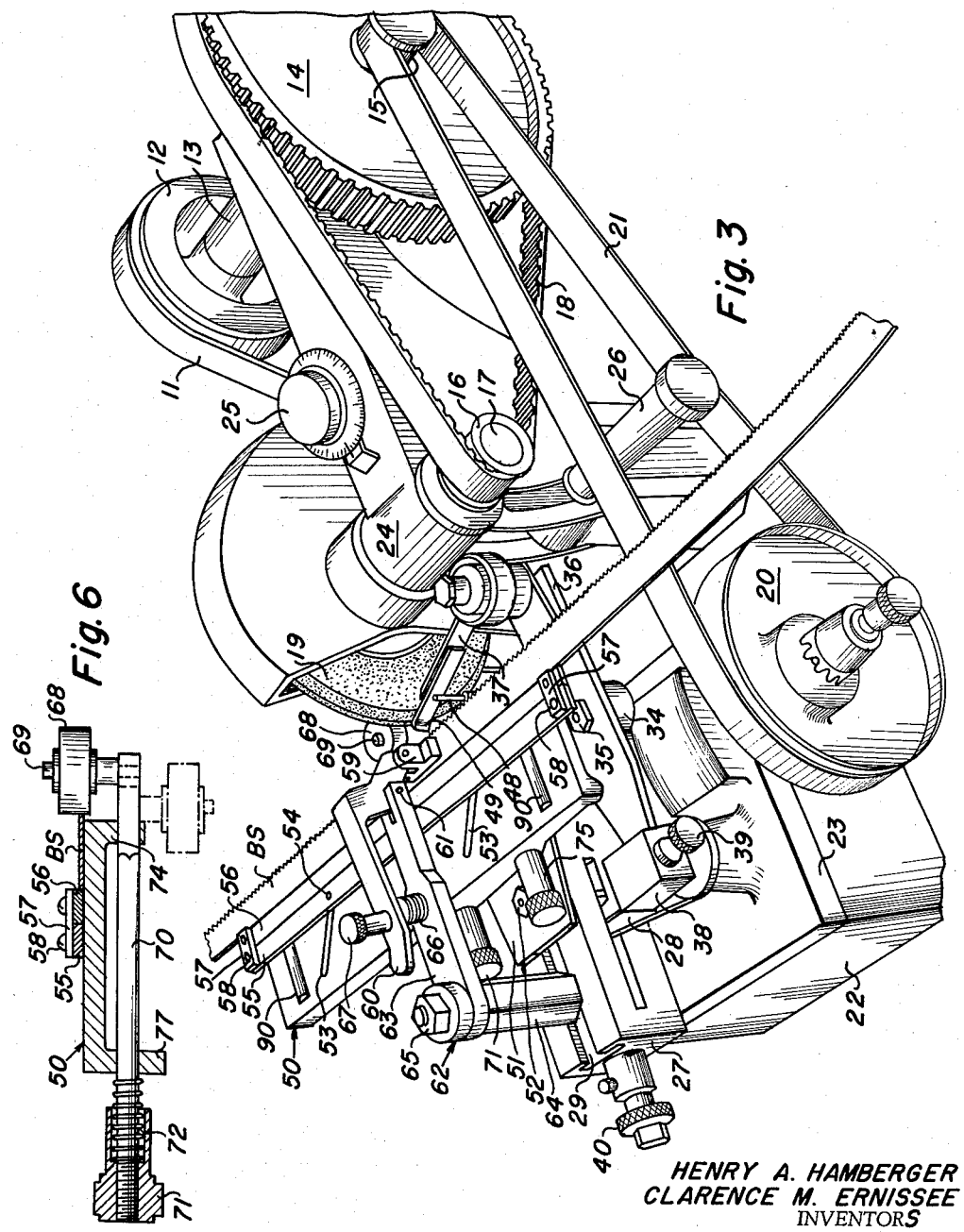
HENRY A. HAMBERGER
CLARENCE M. ERNISSEE
INVENTORS
BY 
AGENT

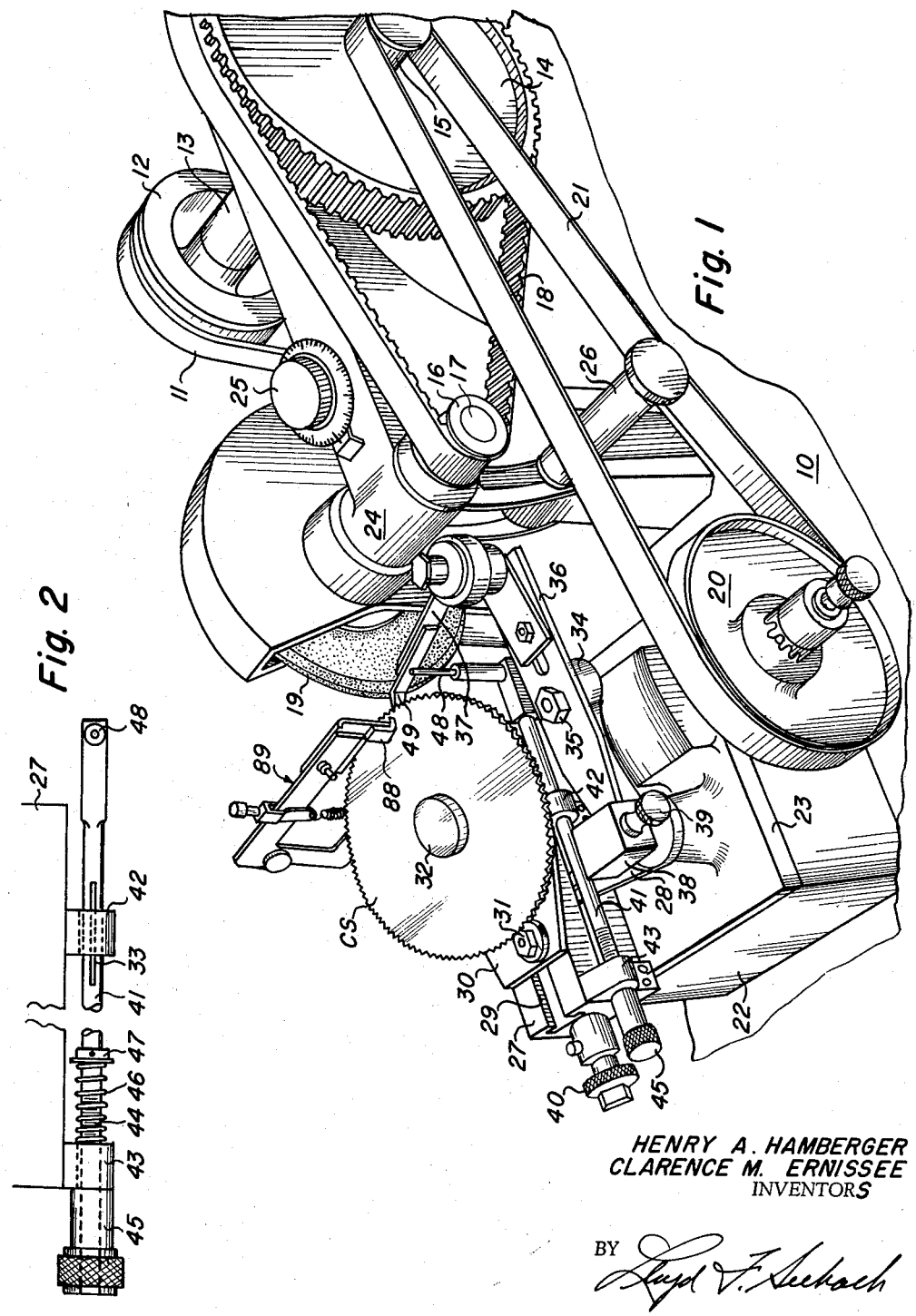

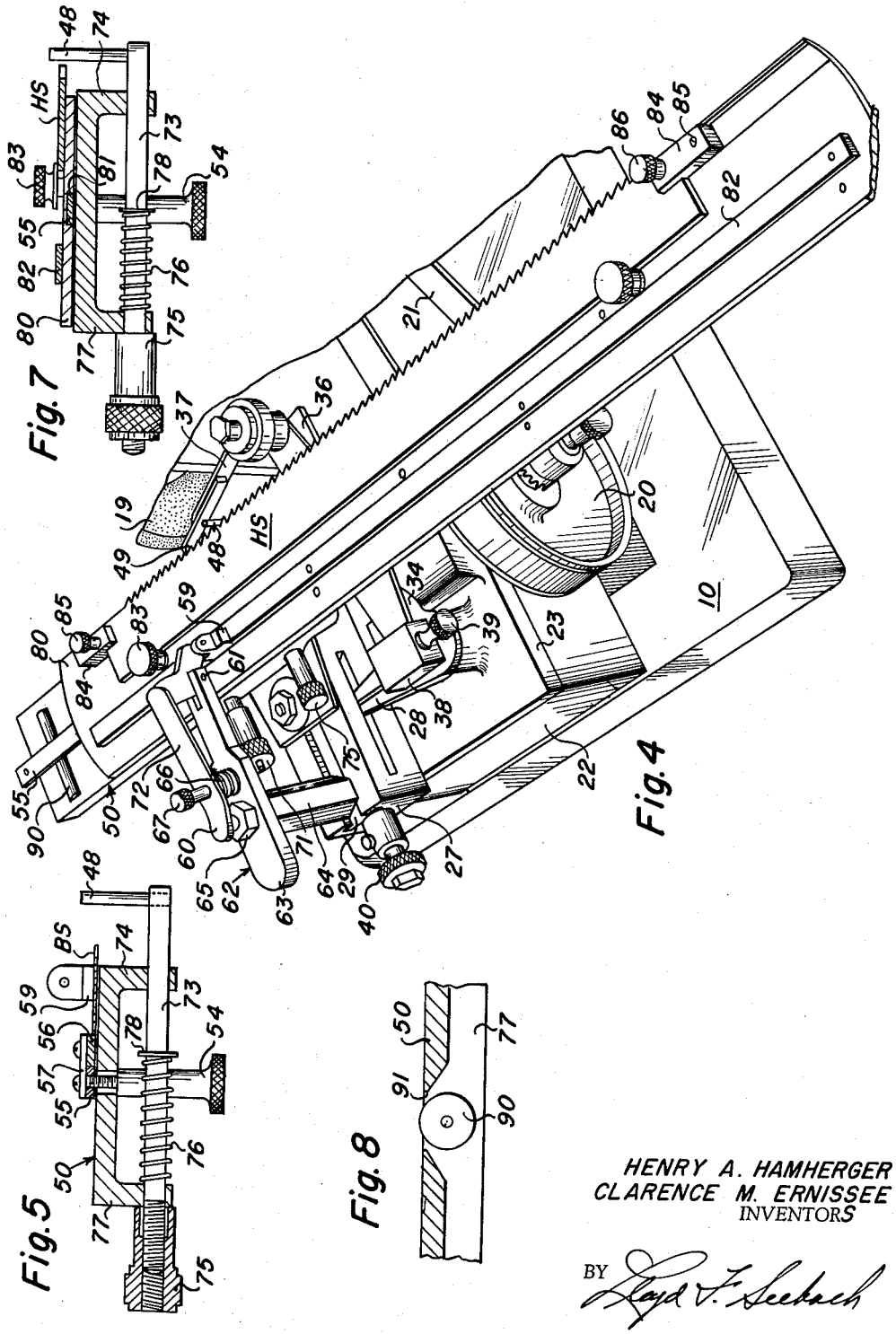

United States Patent Office 2,977,822
Patented Apr. 4, 1961

2,977,822
AUTOMATIC SAW SHARPENER

Henry A. Hamberger, Rochester, and Clarence M. Ernissee, Victor, N.Y., assignors to Hamco Machines, Incorporated, Rochester, N.Y., a corporation of New York Filed Aug. 18, 1958, Ser. No. 755,651

6 Claims. (Cl. 76—43)

This invention relates to grinding machines and more particularly to a grinding machine for automatically sharpening the teeth of circular saws, band saws and hack saws especially of the metal cutting type.

The invention represents an improvement of the automatic grinder for circular saws disclosed in U.S. Patent Nos. 2,570,118 and 2,808,743 by which the saw indexing mechanism for circular saws can also be readily utilized for indexing loop-type band saw blades and hack saw blades. The invention also provides another improvement in that the indexing means can be directed into engagement with a tooth for moving it into an aligned position with respect to the grinding wheel irrespective of the travel of the indexing means.

In the first of the above-mentioned patents, the indexing means is moved into engagement with a tooth of the saw for indexing one or more teeth with respect to the grinding wheel. When very small saws are being sharpened, that is, circular saws of the order of one to two inches in diameter and having 50–75 teeth per inch, the travel or movement of the indexing means and the saw becomes very small. As a result, the indexing means is usually set to engage several teeth ahead of the tooth that is next to be sharpened. This action allows for any error in indexing to accumulate as successive teeth are moved into position with respect to the grinding wheel.

This disadvantage is overcome by the invention in that it permits the indexing means to be readily adapted to band and hack saw blades as well as circular saws, by providing a means which permits the movement of the indexing means and the saw to be increased and directs the indexing means into engagement with only the tooth next to be positioned with respect to the grinding wheel. With this arrangement the accumulation of error is eliminated because the tooth next to be ground is the one actually engaged and since the travel can be increased, the indexing means can move the tooth into exact position and alignment with the grinding wheel.

As disclosed in the above-mentioned patents, the indexing means is mounted on an arm and is oscillated toward and away from the saw, said arm being arranged substantially at right angles to another arm which engages the supporting member for the saw to simultaneously impart a reciprocating movement to the supporting member. The arms are mounted on a rotatable member which is oscillated by an actuating means driven from the main motor drive. A member is mounted on the supporting member and carries a pin at one end thereof which is positioned between the teeth of the saw and the indexing means. This member is movable independently of the support member so as to adjust the position thereof with respect to the saw teeth and the indexing means. As the indexing means moves toward the saw to engage one of the teeth for moving the saw, the indexing means is rotated about its pivot and directed into engagement with the desired tooth by said pin. Accordingly, the travel of the saw and support member can be greater than would normally be necessary without effecting the indexing of the saw. This greater travel permits the indexing means to be moved into closer proximity with respect to the grinding wheel to actually position the tooth engaged thereby in exact alignment with the grinding wheel.

The primary object of the invention is, therefore, to provide a grinder for saw blades in which a means is positioned with respect to the indexing means for permitting the movement of the saw supporting member and the indexing means to be increased whereby the tooth engaged by the indexing means is positioned in exact alignment with the grinding wheel.

Another object of the invention is to provide a grinder for saw blades in which a device which is carried by the saw supporting member and positioned between the saw and the indexing means is independently adjustable with respect to the saw teeth for controlling the engagement of the indexing means with said saw teeth whereby the engaged tooth is positioned with respect to the grinding wheel.

And yet another object of the invention is to provide a grinder for saw blades in which a means for controlling the indexing means with respect to the tooth of the saw to be engaged thereby is readily adapted for use with circular saws, band saw blades and hack saw blades.

Other objects and advantages will be apparent to those skilled in the art by the description which follows.

Reference is now made to the accompanying drawings wherein like reference numerals designate like parts and wherein:

Fig. 1 is a perspective view of the grinding machine showing the arrangement of the device for use with circular saws;

Fig. 2 is a partial plan view of the adjustable pin for controlling the movement of the indexing means and discloses an arrangement by which it can be mounted on the support member to be used in conjunction with circular saws.

Fig. 3 is a perspective view of the grinding machine showing the support member utilized for band saws and the arrangement of the device thereon;

Fig. 4 is a perspective view of the grinding machine showing the slidable support for hack saws and the arrangement of the device on the transverse support member;

Fig. 5 is a vertical section through the support member and showing the structure for locating a band saw thereon;

Fig. 6 is a vertical section through the transverse support member showing the member for holding a band saw blade against the locating member and showing the same member in an inoperative position in dotted lines;

Fig. 7 is a vertical section through the transverse support member showing the slidable support for hack saw blades mounted thereon; and Fig. 8 is a partial longitudinal section through the transverse support member showing the arrangement of the rollers thereon.

In the illustrated embodiment of the invention, the mechanism is mounted on a plate 10 which can be a bed plate or a plate on a frame depending on whether the saw grinder is utilized on a bench or on the floor. With respect to Figs. 1, 3 and 4 a motor, which is not shown, drives pulley 12 by means of a belt 11. Pulley 12 in turn, drives a shaft journaled in bearing 13 and the pulleys 14 and 15 which are fixed or keyed to said shaft, the complete drive being disclosed in the above U.S. Patent No. 2,570,118. Pulley 14 drives pulley 16 on shaft 17 by means of timing belt 18. At the opposite end of shaft 17, grinding wheel 19 is mounted thereon and is, therefore, rotated by belt 18. Pulley 15 drives pulley 20 by means of belt 21, pulley 20 driving a shaft which extends into mechanism box 22 having a cover plate 23. Pulley 16, shaft 17 and grinding wheel 19 are carried by bearing member 24 which is pivotally mounted on the shaft in bearing 13 and adjustable by means of knob 25 for the purpose of raising or lowering grinding wheel 19 with respect to the saw, as shown in the above U.S. Patent No. 2,808,743, the assembly being locked in its adjusted position by knob 26.

The support means for the saw comprises a block 27 having ways which engage corresponding ways on cover plate 23, block 27 being moved along said ways by arm 28 for moving the circular saw CS into and out of engagement with grinding wheel 19. Block 27 is provided with a T-slot 29 for securing holder 30 thereto by means of the bolt and nut designated by 31. The holder 30 receives the pin or arbor 32 by means of which saw CS is mounted on said holder. A shaft, not shown, is rotatably mounted in box 22 and to this shaft arm 28 and arm 34 are fixed for movement therewith, the arms 28 and 34 being arranged substantially at right angles to each other. The mechanism within box 22 imparts an oscillating motion to the shaft which, in turn, moves arms 28 and 34 therewith, the mechanism being disclosed in detail in the above U.S. Patent No. 2,570,118. At 35, a plate 36 is pivotally mounted on arm 34 and at its forward end carries a pivotally mounted indexing means 37. Indexing means 37 is biased in a counterclockwise direction against a stop pin by a spring, as shown in the above patents. The rear end of plate 36 is mounted within block 38 and its position on arm 34 can be adjusted by means of knob 39. With reference particularly to Figs. 1, 3 and 4, the mechanisms described thus far, when considered with respect to the disclosure in U.S. Patent No. 2,570,118, provides for movement of block 27 toward and away from grinding wheel 19 and movement of indexing means 37 into and out of engagement with the saw teeth, the position of arm 28 with respect to block 27 being adjustable by knob 40 and the position of plate 36 being adjustable by knob 39.

As pointed out hereinbefore, small circular saws pose a problem, particularly when of relatively small diameter and having a large number of teeth per inch, in that the movement of arm 28 and indexing arm 37 is very small. In order to overcome this problem, the rod 41 is mounted on the side of block 27 in a forward bearing block 42 and a rear bearing block 43, and rod 41 being prevented from rotating by a key and slot arrangement 33 in block 42, see Fig. 2. One end of rod 41 is provided with a threaded portion 44 for receiving knob 45, also see Fig. 2, the rod being biased in a forward direction by spring 46 arranged between collar 47 and block 43. The other end of rod 41 is square or rectangular and carries a pin 48 which extends vertically upward between the saw and indexing means 37. By means of knob 45, the position of pin 48 with respect to the saw teeth or indexing means 37 can be varied thereby controlling the tooth to be engaged by indexing finger 49. More specifically, by adjusting the movement of arms 28 and 34 so that the movement is greater than that required for normal indexing of the saw teeth and then adjusting pin 48 into a position in which indexing finger 49 is directed into engagement with the tooth to next be positioned with respect to grinding wheel 19, the indexing takes place at the end of the movement of finger 49 toward the saw and the overtravel of the block 27 permits the finger to be moved into closer proximity to the grinding wheel 19. The saw CS is frictionally engaged in the immediate vicinity of grinding wheel 19 by the block 88 which is mounted on the holder 89 in a manner disclosed in the above-mentioned Patent 2,570,118.

In Fig. 3, an embodiment is disclosed for grinding the teeth on a band saw blade BS of the loop type. The loop of the blade is supported by suitable means not shown with only a portion of the blade positioned with respect to the grinding wheel at any time. The support member 50 for the blade is provided with an extending plate 51 which is secured to block 27 by means of a T bolt not designated by 52 in a well known manner whereby member 50 is mounted transversely of block 27, as shown in Fig. 3. Member 50 is provided with two parallel, diagonal slots 53 through one of which a stud 54 extends to threadably engage the strip 55 and lock it in position on member 50, see Fig. 5. By means of the diagonal slots, strip 55 can be moved toward or away from grinding wheel 19 and is always maintained in a parallel relationship to the forward edge of member 50. A second strip 56 is secured to strip 55 by tie members 57, and screws 58. The second strip serves as a locating means for the rear edge of the saw blade BS, as well as a wear bar which can be readily replaced. By adjusting strips 55 and 56 as a unit on member 50, various width saw blades can be accommodated on support member 50, the position of strips 55 and 56 determining the amount of overhang of the saw teeth with respect to the forward face of member 50. The saw blade BS is maintained against rollers 90 in member 50, as described hereinafter, by the friction block 59 which is carried by arm 60 pivotally mounted at 61 to holder 62 comprising arm 63 and post 64. Post 64 is secured to block 27 by a T-bolt and nut designated by 65. Arm 60 is biased toward the saw blade by spring 66 and the bias can be adjusted by finger screw 67. In order to hold the saw blade against locating strip 56, roller 68 which can be of fiber or of a material, such as nylon, is freely rotatable on stud 69 carried by rod 70, see Fig. 6. The pressure or force with which roller 68 engages the teeth of the saw can be altered by knob 71 which varies the compression of spring 72. Block 59 and roller 68 hold the saw blade BS against member 50 and locating strip 56, respectively, in the immediate vicinity of the tooth being ground and, at the same time, permit the indexing finger 49 to move the saw blade relative thereto.

In this particular embodiment of the invention, pin 48 is carried on the end of rod 73 which is either square or rectangular in cross section and is journaled in a similar shaped aperture in the front rib 74 of support member 50. The threaded end of rod 73 is engaged by knob 75 and spring 76, which is arranged between rear rib 77 and washer 78, urges rod 73 to the right, as shown in Fig. 5. The position of pin 48 can, therefore, be varied independently of member 50 and block 27 in relation to the saw blade BS and indexing finger 49. As in the previously described embodiment, the travel of block 27, member 50 and saw blade BS can be greater than would normally be required simply by adjusting pin 48 whereby finger 49 will engage the exact tooth to next be positioned with respect to grinding wheel 19. It should be pointed out at this point that successive teeth need not necessarily be indexed into position. For example, if every other tooth of a saw is to be ground, as may be the case with many circular saws or hack saws, then pin 48 can be adjusted to a position in which every other tooth is engaged by finger 49 and only the engaged teeth will then be positioned with respect to grinding wheel 19.

In order to utilize the arrangement just described for sharpening hack saw blades, as shown in Fig. 4, strip 56 and tie members 57 are removed from support member 50 and plate 80, which is provided on the underside with a longitudinal groove 81 is placed on member 50 with strip 55 in groove 81. Plate 80 is provided with a smooth strip 82 which is engaged by friction block 59 and with several groups of tapped holes into which finger screws 83 are turned for engaging the hack saw blade HS for holding it in position on plate 80, the tapped holes to be used depending on the width of the saw blade. To prevent endwise movement of the saw blade, clips 84 are secured to plate 80 by screws 85 and finger screws 86 carried thereby are turned inwardly to engage the saw blade HS. The roller 68 can be moved to an inoperative position, as shown in dotted lines in Fig. 6, by backing off knob 87 until the cylindrical portion of rod 70 extends beyond the front surface of member 50. In the arrangement just described, pin 48 is adjusted as previously described and indexing of the tooth to next be positioned with respect to grinding wheel 19 by finger 49 results in movement of the saw blade HS and plate 80 as a unit with respect to support member 50 and friction block 59.

In order to reduce the friction due to the saw blade BS moving relative to support member 50, as described with respect to Fig. 3, and to the saw blade HS and plate 80 moving relative to support member 50, as described with respect to Fig. 4, support member 50 is provided with rollers 90, as shown in detail in Fig. 8. Rollers 90 are journaled in the front and rear ribs 74 and 77 of support member 50 and extend through transverse apertures 91 which are of a shape best shown in Fig. 8. The periphery of rollers 90 lie just above the top surface of support member 50 so that, in effect, strips 55 and 56, plate 80, as well as the saw blades BS and HS, as shown in Fig. 3, are supported by said rollers.

From the above description, it should be evident that the structure thus described presents an improvement which readily lends itself to being adapted to a number of types of saws as well as such saws having a wide range of number of teeth per inch. While the invention has been described with respect to a preferred embodiment thereof for each of these types of saws and since modifications thereof will be apparent to those skilled in the art, the invention is not to be limited to the disclosure but is defined by the appended claims.

Having now particularly described our invention, what we desire to secure by Letters Patent of the United States and what we claim is:

1. In a machine for grinding saw teeth, the combination comprising a grinding wheel, a driving means operatively connected to said grinding wheel for imparting rotation thereto, a support means for maintaining said saw in a plane perpendicular to the plane of said grinding wheel, an indexing means for engaging the teeth of said saw, rotatable means including an arm operatively connected to said support means and a second arm for supporting said indexing means, said arms being arranged substantially perpendicular to each other, an actuating means operatively connected to said drive means for oscillating said arms through equal angles for simultaneously imparting a reciprocating motion to said support means for moving said saw into and out of engagement with said grinding wheel and an oscillating motion to said indexing means for intermittently moving said saw upon movement of said saw away from said grinding wheel, and means arranged on said support means between said saw and said indexing means and independently movable with respect to said support means and said indexing means for directing said indexing means into engagement with only the tooth of said saw to next be positioned with respect to said grinding wheel.

2. In a machine for grinding saw teeth, the combination comprising a grinding wheel, a driving means operatively connected to said grinding wheel for imparting rotation thereto, a support means for maintaining said saw in a plane perpendicular to the plane of said grinding wheel, an indexing means for engaging the teeth of said saw, rotatable means including an arm operatively connected to said support means and a second arm for supporting said indexing means, said arms being arranged substantially perpendicular to each other, an actuating means operatively connected to said drive means for oscillating said arms through equal angles for simultaneously imparting a reciprocating motion to said support means for moving said saw into and out of engagement with said grinding wheel and an oscillating motion to said indexing means for intermittently moving said saw upon movement of said saw away from said grinding wheel, and means arranged on said support means and including a member positioned between the teeth of said saw and said indexing means and independently movable toward and away from said saw teeth for engaging said indexing means as it is moved toward said saw teeth and directing said indexing means into engagement with the tooth to next be positioned with respect to said grinding wheel.

3. In a machine for grinding the teeth of a band saw, the combination comprising a grinding wheel, a driving means operatively connected to said grinding wheel for imparting rotation thereto, a reciprocatory member slidably mounted for movement toward and away from said grinding wheel, a support member mounted transversely of said reciprocatory member for maintaining at least a portion of the saw being ground in a plane perpendicular to the plane of said grinding wheel, means on said support member for locating the teeth of said saw in a predetermined relation to the edge of said support member, means carried by said reciprocatory member be and biased into frictional engagement with said saw in the immediate vicinity of the teeth being ground for holding said saw on said support member and permitting movement of said saw relative to said support member, means mounted on said support member in close proximity to said grinding wheel and biased toward said support member for frictionally engaging said teeth and maintaining said saw against said locating means, an indexing means for intermittently engaging the teeth of said saw, rotatable means including an arm operatively connected to said reciprocatory means and a second arm for supporting said indexing means, said arms being arranged substantially perpendicular to each other, an actuating means operatively connected to said drive means for oscillating said arms through equal angles for simultaneous'y imparting a reciprocating motion to said reciprocatory member for moving said saw into and out of engagement with said grinding wheel and an oscillating motion to said indexing means for intermittently moving said saw upon movement of said saw away from said grinding wheel, and means arranged on said support member between said saw and said indexing means and independently movable with respect to said reciprocatory means and said indexing means for controlling the engagement of said indexing means with said saw teeth whereby the tooth engaged by said indexing means is positioned with respect to said grinding wheel.

4. In a machine for grinding the teeth of a band saw, the combination comprising a grinding wheel, a driving means operatively connected to said grinding wheel for imparting rotation thereto, a reciprocatory member slidably mounted for movement toward and away from said grinding wheel, a support member mounted transversely of said reciprocatory member for maintaining at least a portion of the saw being ground in a plane perpendicular to the plane of said grinding wheel, means on said support member for locating the teeth of said saw in a predetermined relation to the edge of said support member, means carried by said reciprocatory member and biased into frictional engagement with said saw in the immediate vicinity of the teeth being ground for holding said saw on said support member and permitting movement of said saw relative to said support member, means mounted on said support member in close proximity to said grinding wheel and biased toward said support member for frictionally engaging said teeth and maintaining said saw against said locating means, an indexing means for intermittently engaging the teeth of said saw, rotatable means including an arm operatively connected to said reciprocatory means and a second arm for supporting said indexing means, said arms being arranged substantially perpendicular to each other, an actuating means operatively connected to said drive means for oscillating said arms through equal angles for simultaneously imparting a reciprocating motion to said reciprocatory member for moving said saw into and out of engagement with said grinding wheel and an oscillating motion to said indexing means for intermittently moving said saw upon movement of said saw away from said grinding wheel, means arranged on said support member and including a member positioned between the teeth of said saw and said indexing means and independently movable toward and away from said saw teeth for engaging said indexing means as it is moved toward the saw teeth and directing said indexing means into engagement with the tooth to next be positioned with respect to said grinding wheel.

5. In a machine for grinding the teeth of a hack saw, the combination comprising a grinding wheel, a drive means operatively connected to said grinding wheel for imparting rotation thereto, a reciprocatory member mounted for movement toward and away from said grinding wheel, a support member mounted transversely of said reciprocatory member, a member slidably mounted on said support member for maintaining said saw in a plane perpendicular to the plane of said grinding wheel, means on said member for holding said saw and locating the teeth of said saw in a predetermined relation to the edge of said support member, means carried by said reciprocatory member and biased into frictional engagement with said member in the immediate vicinity of the teeth being ground for holding said member on said support member and permitting movement of said member and the saw thereon relative to said support member, an indexing means for intermittently engaging the teeth of said saw, rotatable means including an arm operatively connected to said reciprocatory means and a second arm for supporting said indexing means, said arms being arranged substantially perpendicular to each other, an actuating means operatively connected to said drive means for oscillating said arms through equal angles for simultaneously imparting a reciprocatory motion to said reciprocatory member for moving said saw into and out of engagement with said grinding wheel and an oscillating motion to said indexing means for intermittently moving said saw and said member upon movement of said saw away from said grinding wheel, and means arranged on said support between said saw and said indexing means and independently movable with respect to said reciprocatory means and said indexing means for controlling the engagement of said indexing means with said saw teeth whereby the tooth engaged by said indexing means is positioned with respect to said grinding wheel.

6. In a machine for grinding the teeth of a hack saw, the combination comprising a grinding wheel, a drive means operatively connected to said grinding wheel for imparting rotation thereto, a reciprocatory member mounted for movement toward and away from said grinding wheel, a support member mounted transversely of said reciprocatory member, a member slidably mounted on said support member for maintaining said saw in a plane perpendicular to the plane of said grinding wheel, means on said member for holding said saw and locating the teeth of said saw in a predetermined relation to the edge of said support member, means carried by said reciprocatory member and biased into frictional engagement with said member in the immediate vicinity of the teeth being ground for holding said member on said support member and permitting movement of said member and the saw thereon relative to said support member, an indexing means for intermittently engaging the teeth of said saw, rotatable means including an arm operatively connected to said reciprocatory means and a second arm for supporting said indexing means, said arms being arranged substantially perpendicular to each other, an actuating means operatively connected to said drive means for oscillating said arms through equal angles for simultaneously imparting a reciprocating motion to said reciprocatory member for moving said saw into and out of engagement with said grinding wheel and an oscillating motion to said indexing means for intermittently moving said saw upon movement of said saw away from said grinding wheel, and means arranged on said support member and including a member positioned between said saw teeth and said indexing means and independently movable toward and away from said saw teeth for engaging said indexing means as it is moved toward the saw teeth and directing said indexing means into engagement with the tooth to next be positioned with respect to said grinding wheel.

References Cited in the file of this patent
UNITED STATES PATENTS

| | | |
|---|---|---|
| 2,091,501 | De Long et al. | Aug. 31, 1937 |
| 2,808,743 | Hamberger | Oct. 8, 1957 |

FOREIGN PATENTS

| | | |
|---|---|---|
| 422,316 | France | Mar. 18, 1911 |
| 293,503 | Switzerland | Dec. 16, 1953 |